(12) United States Patent
Kinder et al.

(10) Patent No.: US 7,921,104 B2
(45) Date of Patent: Apr. 5, 2011

(54) INVOKING ACTIONS ON DATA VIA LDAP REQUESTS

(75) Inventors: Nathan G. Kinder, Castro Valley, CA (US); Nang Kon Kwan, Cupertino, CA (US); Steven W. Parkinson, San Jose, CA (US)

(73) Assignee: Red Hat, Inc., Raleigh, NC (US)

( * ) Notice: Subject to any disclaimer, the term of this patent is extended or adjusted under 35 U.S.C. 154(b) by 266 days.

(21) Appl. No.: 11/515,236

(22) Filed: Aug. 31, 2006

(65) Prior Publication Data

US 2008/0059427 A1    Mar. 6, 2008

(51) Int. Cl.
*G06F 7/00* (2006.01)
*G06F 17/30* (2006.01)
(52) U.S. Cl. ............ 707/722; 707/767; 707/770
(58) Field of Classification Search .......... 707/100
See application file for complete search history.

(56) References Cited

U.S. PATENT DOCUMENTS

| | | | |
|---|---|---|---|
| 6,635,089 B1 | 10/2003 | Burkett et al. | |
| 6,748,374 B1* | 6/2004 | Madan et al. | 707/3 |
| 6,850,928 B1 | 2/2005 | McClure et al. | |
| 6,877,026 B2* | 4/2005 | Pointer et al. | 707/10 |
| 7,512,965 B1* | 3/2009 | Amdur et al. | 726/1 |
| 7,516,143 B2* | 4/2009 | Cunningham et al. | 1/1 |
| 2003/0105978 A1* | 6/2003 | Byrne | 713/201 |
| 2003/0115196 A1* | 6/2003 | Boreham et al. | 707/4 |
| 2003/0191757 A1* | 10/2003 | Ambrosini et al. | 707/3 |
| 2004/0199485 A1* | 10/2004 | Caswell | 707/1 |
| 2005/0216485 A1* | 9/2005 | Bell et al. | 707/100 |
| 2006/0020586 A1* | 1/2006 | Prompt et al. | 707/3 |
| 2006/0047641 A1* | 3/2006 | Keni | 707/3 |
| 2008/0060057 A1* | 3/2008 | Barchi et al. | 726/3 |

* cited by examiner

*Primary Examiner* — Cam Y T Truong
(74) *Attorney, Agent, or Firm* — Blakely, Sokoloff, Taylor & Zafman LLP

(57) ABSTRACT

A method and apparatus for invoking actions on data in a Lightweight Directory Access Protocol (LDAP) repository. In one embodiment, the method includes receiving a request pertaining to data in the LDAP repository. The request indicates at least one action identified in the definition of the LDAP repository. The method further includes causing the action to be performed with respect to one or more data items in the LDAP repository.

20 Claims, 6 Drawing Sheets

INVOKING ACTIONS ON DATA VIA LDAP REQUESTS

TECHNICAL FIELD

Embodiments of the present invention relate to a Lightweight Directory Access Protocol (LDAP), and more specifically to invoking actions on data via LDAP requests.

BACKGROUND

Light Weight Directory Access Protocol (LDAP) has become very popular due to its efficient and fast data access. A large number of applications/services are currently being developed which use an LDAP directory as their centralized data repository.

The LDAP directory stores entries as a tree. Each entry may consist of one or more attribute names and attribute values. An entry may be uniquely identified by its distinguished name (DN) that may include a common name (cn) attribute of the entry and DN of a parent entry.

The contents of the entries are governed by an LDAP directory schema. The schema defines object classes, and each entry has an objectClass attribute containing named classes defined in the schema. The objectClass attribute may be multivalued, and contain the class "top" as well as some number of other classes. The schema definition for each class an entry belongs to defines what kind of object the entry may represent (e.g., a person, organization or domain). Membership in a particular class gives the entry the option of containing one set of attributes (optional attributes), and the obligation of containing another set of attributes (mandatory or required attributes). For example, an entry representing a person might belong to the class "person". Membership in the "person" class would require the entry to contain the "sn" and "cn" attributes, and allow the entry also to contain "userPassword", "telephoneNumber", and other attributes.

An LDAP directory server may access specific data items in the LDAP directory in response to a client request. If a certain action needs to be performed on a data item accessed in the LDAP directory, the logic for the action has to be hardcoded in the LDAP server.

BRIEF DESCRIPTION OF THE DRAWINGS

The present invention is illustrated by way of example, and not by way of limitation, in the figures of the accompanying drawings and in which.

DETAILED DESCRIPTION

Figure 1:
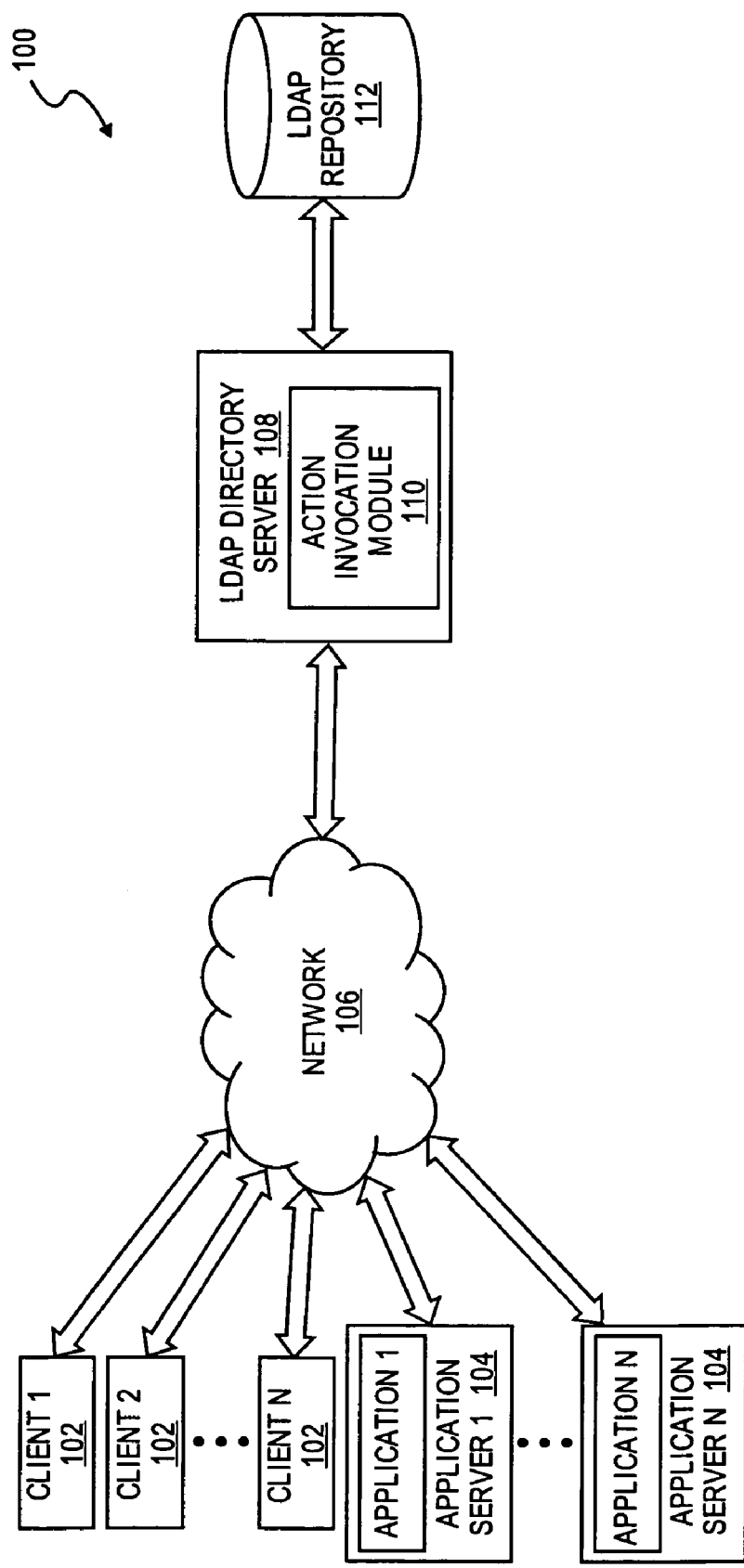
FIG. 1 illustrates a network architecture in which embodiments of the present invention may be implemented.

Described herein is a method and apparatus for invoking actions on data via Lightweight Directory Access Protocol (LDAP) requests. In one embodiment, an LDAP repository schema defines actions that can be performed on LDAP repository entries of relevant types. An action can be represented as a script, an applet, a plugin or some other program or module. When an LDAP directory server receives a request indicating an action defined in the schema, the LDAP directory server invokes the action and causes it to be performed on one or more data items from the LDAP repository. Depending on the nature of the request and the action's predefined behavior, the action may generate a list of data items from the LDAP repository, construct dynamic values, update the contents of the LDAP repository, etc.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; etc.

FIG. 1 illustrates an exemplary network architecture 100 in which embodiments of the present invention may operate. The network architecture 100 may include client devices (clients) 102, an LDAP directory server 108 and a network 106. The clients 102 may be, for example, personal computers (PCs), mobile phones, palm-sized computing devices, personal digital assistants (PDAs), etc.

The clients 102 are coupled to the LDAP directory server 108 via the network 106, which may be a public network (e.g., Internet) or a private network (e.g., Ethernet or a local area Network (LAN)). The LDAP directory server 108 may contain a server front-end responsible for network communications, plugins for server functions (such as access control and replication), a basic directory tree containing server-related data, and a database back-end plugin responsible for managing the storage and retrieval of LDAP repository data.

In one embodiment, the clients 102 communicate with the LDAP directory server 108 via a web server (not shown). For example, the clients 102 may host web browsers that communicate with the web server using HTTP to request information. The web server may then communicate with the LDAP directory server 108 using LDAP to retrieve requested information from an LDAP repository 112. Alternatively, the clients 102 may communicate directly with the LDAP directory server 108 using LDAP to request information stored in the LDAP repository 112.

The network architecture 100 may also include one or more application servers 104 that hosts various applications requesting information from the LDAP directory server 108. The application servers 104 operate as clients in communications with the LDAP directory server 112. Similarly to the clients 102, the application servers 104 may communicate with the LDAP directory server 112 directly or via a web server.

The LDAP repository 112 may be part of the LDAP directory server 108, or it may reside externally (e.g., on a database server). The LDAP repository 112 may contain a tree of data entries. The structure of the entries may be specified in the definition of the LDAP repository 112. The definition of the LDAP repository 112 may be represented as a schema, a table or some other data structure, and may reside independently or inside the LDAP repository 112. For example, the schema may be included in the LDAP repository 112 as a collection of LDAP repository entries rooted at the base DN cn=schema.

The schema may define object classes and attributes associated with each object class. Each entry in the LDAP repository has an objectClass attribute, containing one or more classes defined in the schema. The schema definition for each class an entry belongs to defines what kind of object the entry may represent (e.g., a person, organization or domain). In one embodiment, the schema also defines actions that can be performed on data items of a specific class. Each action is associated with one or more object classes in the schema. An action may be represented as a script, an applet, a plugin, or any other program. The LDAP repository schema may store an action itself (e.g., a script) or a reference (e.g., a link, a URL, a file name, etc.) to the action.

In one embodiment, the LDAP directory server 108 has an action invocation module 110 that causes actions to be performed on data items of the LDAP repository 112. The action invocation module 110 may be part of the LDAP directory server 108 or some other device and/or program, or be an independent module implemented in hardware, software or a combination thereof.

In one embodiment, the action invocation module 110 handles requests, received from clients 102 and applications 104, that indicate actions defined in the schema of the LDAP repository 112. A request may indicate a desired action by explicitly providing the name of the action. The name of the action may be provided as an attribute subtype of a specified attribute. For example, a request may include the expression "pagerNumber;page," where "pagerNumber" is the name of an attribute, and "page" is the name of a script that pages the number stored as the value of "pagerNumber" attribute. Alternatively, a request may indicate a desired action by specifying an attribute whose value should be returned as a result of the request, where the desired action is identified in the schema definition of the specified attribute. For example, a request may ask for the "employees" attribute to be returned for a particular entry. The schema may associate the "employees" attribute with a script that generates an employee list, which is to be returned to the requestor as the value of the "employees" attribute.

In one embodiment, the same action is intended to behave differently depending on its usage indicated in the request. For example, the script "encrypt-rsa" that converts data into the requested type may either be explicitly specified in the request as part of a filter, or be provided indirectly by specifying in the request a return attribute that is associated with the script in the schema. In the former case, the script may perform the required conversion of each entry in the scope of the search to determine which entries satisfy the filter parameters. In the latter case, the script may perform the required conversion only of those entries that do satisfy the filter parameters.

In one embodiment, upon receiving a request indicating a desired action, the action invocation module 110 evaluates the request to determine its intended behavior, and then causes the action to be performed according to the intended behavior. Afterwards, the action invocation module 110 provides the result of the request to a requesting client 102 or application 104. The result may specify whether the action has completed successfully. Alternatively, the result may include one or more data items generated by the action itself or data items generated using an intermediate result provided by the action.

In one embodiment, a set of actions may be defined in the schema to control access to different parts of the LDAP repository. These actions may replace conventional access control lists (ACLs) (also known as access control instructions (ACIs)) that are typically stored within the LDAP repository at the root of the database tree or are included in the LDAP directory server startup file.

In one embodiment, a request may indicate a chain of actions to be performed on relevant data items, with each subsequent action in the chain utilizing the results of a corresponding preceding action. The chain of actions may be explicitly provided in the request. For example, a filter in the request may include "photo;jpg|encrypt-rsa," where the jpg script may convert the value of the photo attribute to a jpg format, which will then be converted to an rsa format by the encrypt-rsa script.

In the context of object oriented programming, the concept of actions is similar to that of methods. Hence, object classes, actions and entries in the LDAP repository 112 can be viewed as respective counterparts of classes, methods and instances used in object oriented programming.

Figure 2:
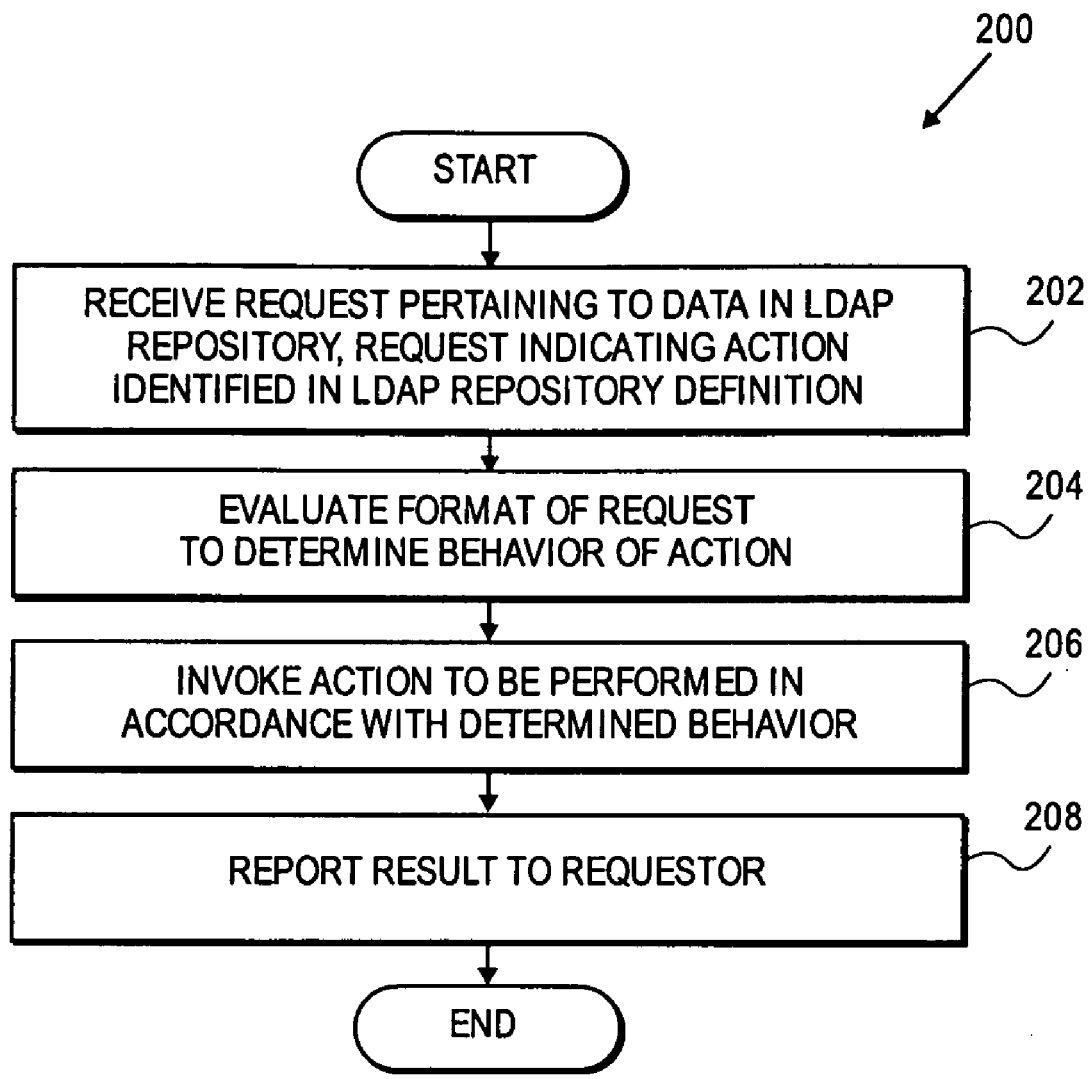
FIG. 2 illustrates a flow diagram of one embodiment of a method for invoking actions on data via LDAP requests.

FIG. 2 illustrates a flow diagram of one embodiment of a method 200 for invoking actions on data via LDAP requests. The method may be performed by processing logic that may comprise hardware (e.g., circuitry, dedicated logic, programmable logic, microcode, etc.), software (such as instructions run on a processing device), or a combination thereof. In one embodiment, method 200 is performed by the LDAP directory server 108 of FIG. 1.

Referring to FIG. 2, method 200 begins with processing logic receiving a request pertaining to data in an LDAP repository (block 202). The request indicates an action identified in the definition of the LDAP repository. The definition of the LDAP repository may be in the form of a schema, a table or any other data structure. For simplicity, the definition of the LDAP repository is referred to herein as a schema.

The action identified in the schema may implement a dynamic behavior with respect to one or more data items in the LDAP repository. The action may be defined in a script, an applet, a plugin or any other program or module. The schema may store the action itself or it may store a reference to the action that is stored somewhere else. In one embodiment, some or all action entries in the schema are defined as global (e.g., to allow an action to create new entries in the LDAP repository).

The schema may associate the action with one or more object classes. In one embodiment, the name of the action is stored in the schema as an attribute subtype, and the action (or a reference to the action) is stored as the value of the attribute subtype. The attribute subtype may be a subtype of a corresponding object class attribute or some other attribute. Alternatively, the schema may not store the action as an attribute subtype, but rather use a different format according to the structure of the LDAP repository and/or requirements of the LDAP directory server.

At block 204, processing logic evaluates the format of the request to determine an intended behavior of the action. As discussed above, the same action may be intended to behave differently depending on its usage indicated in the request. For example, the request may be a search request or an update operation request. A search request may specify the action as part of a filter or it may indirectly provide the action by specifying a return attribute that is associated with the action in the schema. An update operation request can be an add or modify request that specifies the action as an attribute subtype of an attribute to be added or modified. Alternatively, an add or modify request may indirectly provide the action by specifying an attribute to be added or modified as a virtual attribute that is associated with the action in the schema. Embodiments of methods for handling different types of requests are discussed in more detail below in conjunction with FIGS. 3-5.

At block 206, processing logic invokes the action using the definition of the action in the schema. Depending on its intended behavior, the action may be performed in different contexts. For example, the action may be performed in a search as part of filtering to identify data items that satisfy filtering parameters, or after filtering to only affect the data items that satisfied the filter parameters. The action may also be performed as part of an update operation to generate one or more data items to be added to or modified in the LDAP repository, or in any other context.

Upon completion, the action may produce a list of items retrieved from the LDAP repository or a list of dynamic values generated by the action based on data items accessed in the LDAP repository. Alternatively, the action may not generate a list of data items but rather return a result indicating whether the completion is successful.

At block 208, processing logic returns resulting data to the requestor (e.g., a user or an application). The resulting data may be data produced by the action or the result generated using the data produced by the action.

Figure 3:
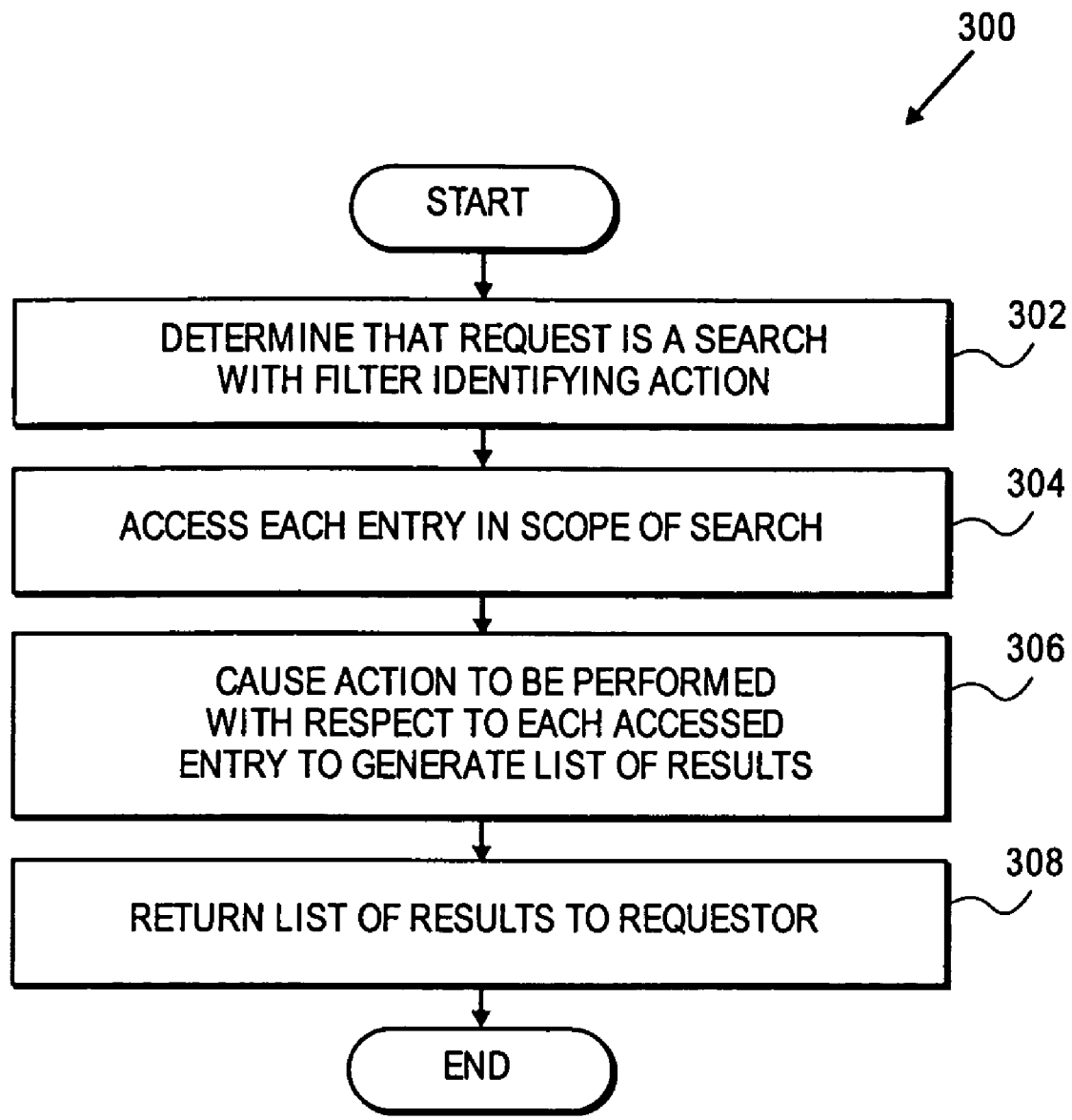
FIGS. 3 and 4 illustrate flow diagrams of two alternative embodiments of a method for handling search requests that require an invocation of an action on LDAP repository data.
Figure 4:
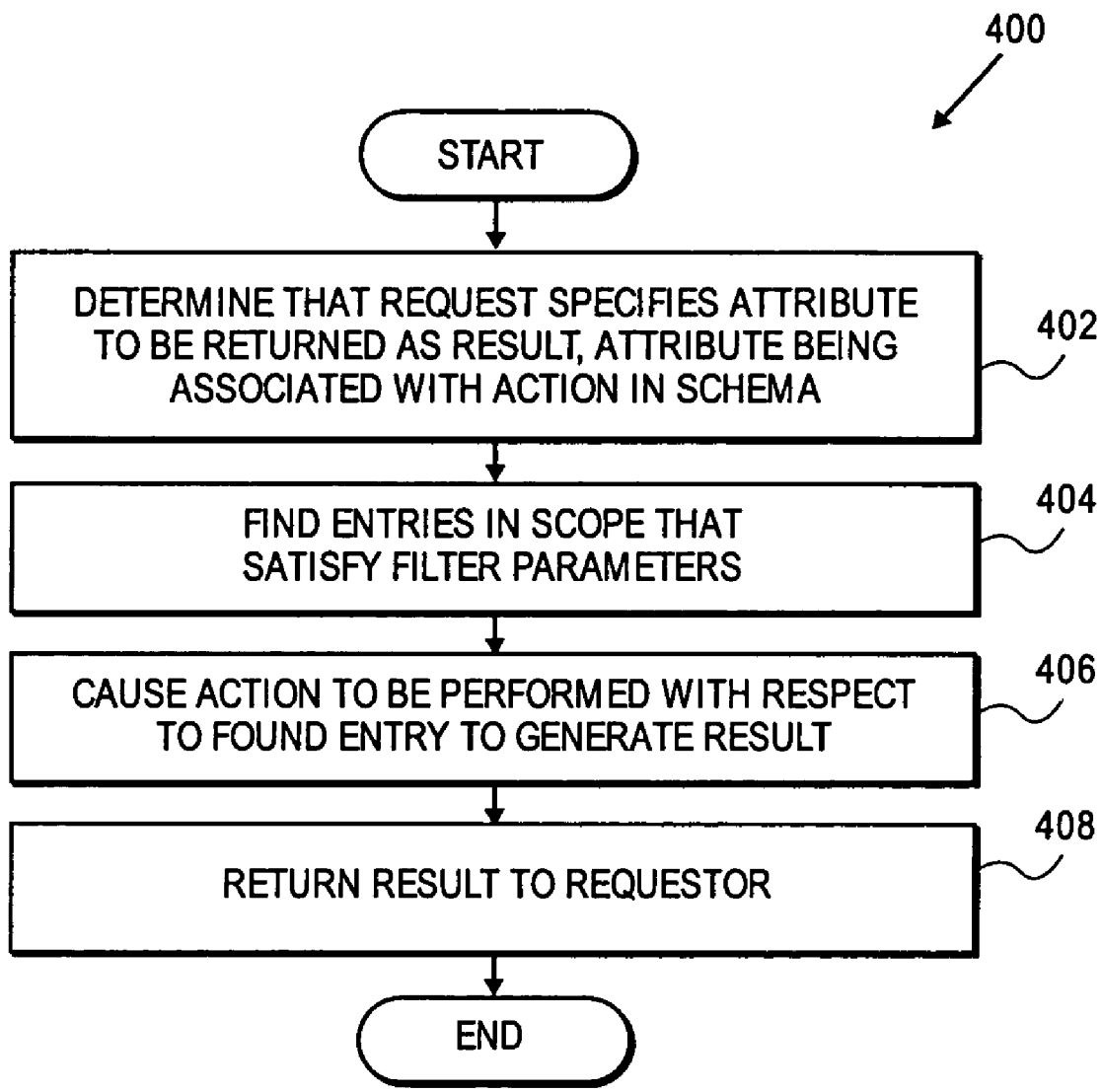

FIGS. 3 and 4 illustrate flow diagrams of two alternative embodiments of a method for handling search requests that require an invocation of an action on LDAP repository data. The method may be performed by processing logic that may comprise hardware (e.g., circuitry, dedicated logic, programmable logic, microcode, etc.), software (such as instructions run on a processing device), or a combination thereof. In one embodiment, the method is performed by the LDAP directory server 108 of FIG. 1.

Referring to FIG. 3, method 300 begins with processing logic determining that a request received from a client is a search request that identifies a desired action in a filter (block 302). An action may be specified in a filter as an attribute subtype and be intended to perform a specific function as part of filtering. Such a function may include querying entries to generate a list of matches. For example, a search request may be expressed as follows:

Search base="uid=jsmith" filter="manager;hier-refs=*" attrs="mail", where script "hier-refs" specified as a subtype attribute is intended to recursively query entries for manager=jsmith to return email addresses of people who report to jsmith.

In another example, an action specified in the filter may be intended to perform an extra functionality when querying entries to generate a list of matches. For example, a search request may be expressed as follows:

Search base: "ou=people, o=Red Hat" filter="cn; soundex=fred" attrs="mail", where script "soundex" specified as a subtype attribute is intended to recursively query entries for names that are pronounced as "fred" and return their email addresses.

In yet another example, an action specified in the filter may be intended to perform a predefined functionality for a specific entry. For example, a search request may be expressed as follows:

Search base="uid=smith" filter="pagerNumber;page=*" attrs="pagerNumber", where script "page" specified as a subtype attribute is intended to page the number of Smith that is stored as the value of the pagerNumber attribute, and return the page number that was used.

In still another example, an action specified in the filter may be intended to perform a predefined functionality for a each entry in the scope. For example, a search request may be expressed as follows:

Search base: "ou=people, o=Red Hat" filter="photo;encrypt-rsa=*" attrs="cn", where script "encrypt-rsa" specified as a subtype attribute is intended to convert every entry in the scope into the requested type, and return the names of people for whom the conversion was performed.

Next, processing logic accesses each entry in the scope of the search (block 304) and causes the action to be performed on each accessed entry to generate a list of results (block 306). As discussed above, the action may involve determining whether accessed entries match search parameters, or applying an extra functionality to each accessed entry (e.g., paging or conversion). At block 308, processing logic returns the list of results to a requestor.

Referring to FIG. 4, method 400 begins with processing logic determining that a request received from a client is a search request that specifies an attribute to be returned, where the attribute is associated with an action in the schema (block 402). In one embodiment, the action is defined in the schema as a subtype of this attribute. In one embodiment, this attribute is a virtual attribute whose value is dynamically constructed by the action. For example, a search request may be expressed as follows:

Search base: "ou=people, o=Red Hat" filter="uid=stevep" attrs=cn, where the cn attribute is virtual, and the value of the cn attribute is dynamically constructed by a script that concatenates givenname and surname attributes.

In another example, a search request may be expressed as follows:

Search base: "ou=people, o=Red Hat" filter= (jpegPhoto=file1) attrs=file, where the file attribute is virtual, and the value of the file attribute is dynamically constructed by a script "encrypt-rsa" that encrypts the specified file.

Next, processing logic finds one or more entries within the scope of the search that satisfy specified filter parameters (block 404) and causes the action to be performed on each found entry to generate a result (block 406). At block 408, processing logic returns the result to a requestor.

An action specified in a request as an attribute subtype (e.g., in a filter) is referred to herein as a subtype action. An action associated in the schema with an attribute specified in a request (e.g., a return attribute) is referred to herein as an attribute action. A subtype action can be applied to any attribute. An attribute action can only be applied to an attribute that the action is associated with in the schema.

Figure 5:
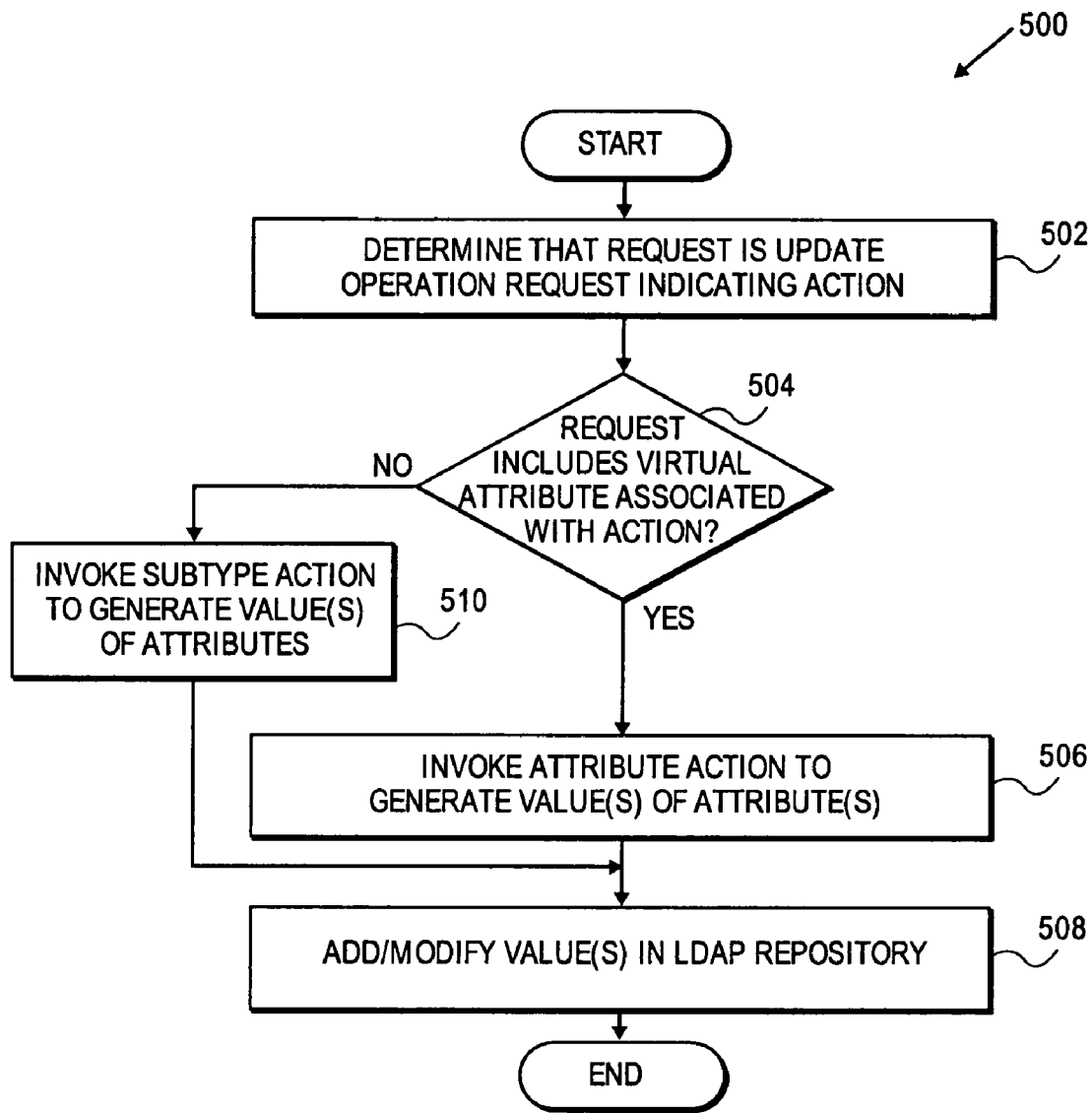
FIG. 5 illustrates a flow diagram of one embodiment of a method for handling update operation requests that require an invocation of an action on LDAP respository data.

FIG. 5 illustrates a flow diagram of one embodiment of a method for handling update operation requests that require an invocation of an action on LDAP repository data. The method may be performed by processing logic that may comprise hardware (e.g., circuitry, dedicated logic, programmable logic, microcode, etc.), software (such as instructions run on a processing device), or a combination thereof. In one embodiment, the method is performed by the LDAP directory server 108 of FIG. 1.

Referring to FIG. 5, method 500 begins with processing logic determining that a request received from a client is an update operation request that indicates an action (block 502). The update operation request may be an add or modify request that identifies the entry to be added or modified. The update operation request may indicate the action by including it as a subtype of an attribute to be added or modified. For example, a modify request may include "photo;jpg" to convert an existing value of the photo attribute to a jpg value and replace the existing value with the new jpg value. Alternatively, the update operation request may not explicitly include the action but rather provide it indirectly by specifying an attribute to be added or modified as a virtual attribute that is associated with the action in the schema. For example, a modify request may include a virtual attribute cn that is associated in the schema with a script that modifies givenname and surname attributes based on the specified value of the cn attribute.

At block 504, processing logic determines whether the update operation request includes a virtual attribute associated with the action in the schema. If so, processing logic invokes the attribute action to generate new value(s) of relevant attribute(s) (e.g., values of givenname and surname attributes) (block 506), and adds these values to the LDAP repository (block 508).

If the update operation specifies the action as a subtype of a particular attribute in the request, processing logic invokes the subtype action to generate a new value(s) of this attribute (block 510), and adds the new value to the LDAP repository (block 508).

Figure 6:
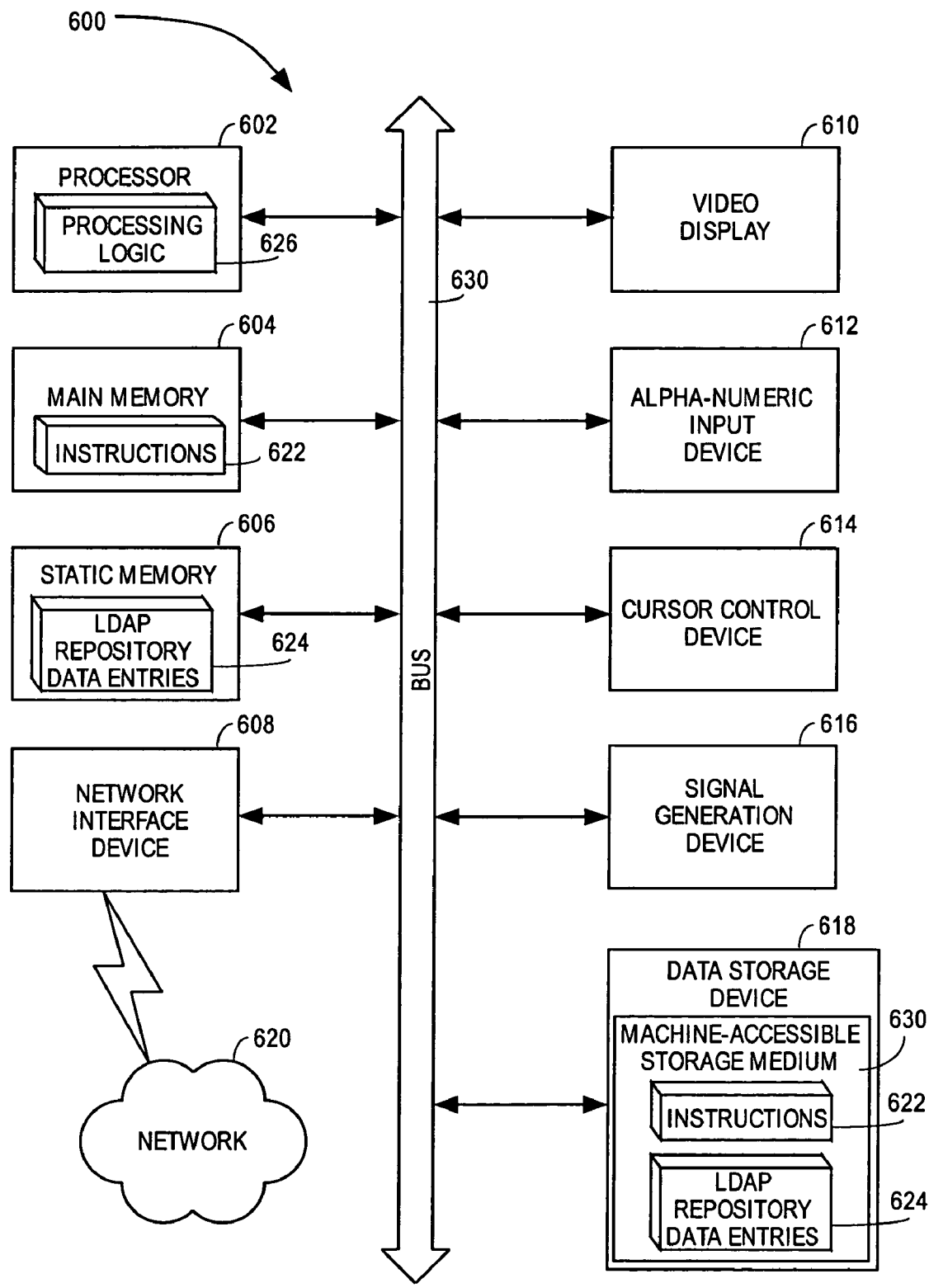
FIG. 6 illustrates a block diagram of an exemplary computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 630 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-accessible storage media. The software 622 may further be transmitted or received over a network 620 via the network interface device 608.

The machine-accessible storage medium 630 may also be used to store LDAP repository data entries 624. LDAP repository data entries 624 may also be stored in other sections of computer system 600, such as static memory 606.

While the machine-accessible storage medium 930 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, and optical and magnetic media.

Thus, a method and apparatus for invoking actions on data via LDAP requests have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   receiving, by a server, a request pertaining to data in a Lightweight Directory Access Protocol (LDAP) repository, the request indicating at least one action;
   evaluating a format of the request to determine a behavior of the action, wherein evaluating the format comprises identifying the behavior of the action based on whether the request has an attribute subtype including an identifier of the action or a return attribute whose value is to be returned as a result of the request, the return attribute being associated with the action in a definition of the LDAP repository;
   accessing the definition of the LDAP repository for data specifying the action using at least one of the action identifier specified in the request and the return attribute specified in the request, the action being represented by associated code, the data specifying the action in the definition of the LDAP repository including the code associated with the action or a reference to the code associated with the action, wherein the definition of the LDAP repository comprises a schema that associates the action with one or more object classes;
   using, by the server, the data specifying the action in the definition of the LDAP repository to cause the action to be performed with respect to one or more data items in the LDAP repository, wherein the action is to be performed based on the identified behavior; and returning a result of the performed action to a requestor.

2. The method of claim 1 wherein the definition of the LDAP repository comprises a schema that associates the action with one or more object classes.

3. The method of claim 1 wherein:
   the action is represented as one or more of a script, an applet, or an independent program.

4. The method of claim 1 wherein the request indicates a sequence of actions, wherein each subsequent action in the sequence uses results of a preceding action.

5. The method of claim 1, wherein:
   evaluating the format of the request comprises determining, based on the format of the request, that the request is a search request with a filter identifying the action; and causing the action comprises accessing each entry within a scope of the search request, and invoking the action to be performed with respect to each accessed entry to generate a list of results.

6. The method of claim 5 further comprising:
   returning the list of results to a requestor.

7. The method of claim 1, wherein: evaluating the format of the request comprises determining, based on the format of the request, that the request is a search request specifying an attribute to be returned for a result of the request, the specified attribute being associated with the action in the definition of the LDAP repository; and causing the action comprises finding entries within a scope of the search request that satisfy filter parameters, and invoking the action to be performed with respect to each found entry to generate a list of results.

8. The method of claim 7 further comprising:
   returning the list of results as a value of the specified attribute.

9. The method of claim 7 wherein the specified attribute is a virtual attribute.

10. The method of claim 1, wherein:
    evaluating the format of the request comprises determining, based on the format of the request, that the request is an update operation request indicating the action; and causing the action comprises invoking the action to be performed to generate at least one new data item.

11. The method of claim 10 further comprising:
    adding the new data item to the LDAP repository; and
    reporting whether the update operation has completed successfully to a requestor.

12. The method of claim 10 wherein the update operation is any one of an add operation or a modify operation.

13. The method of claim 1 wherein the action implements a behavior for controlling access to data in the LDAP repository.

14. An apparatus comprising: a memory;
    a network interface device to receive a request pertaining to data in a Lightweight Directory Access Protocol (LDAP) repository, the request indicating at least one action identified in a definition of the LDAP repository; and
    a processor, coupled to the network interface device via a bus, to evaluate a format of the request to determine a behavior of the action, wherein the processor is to evaluate the format by identifying a behavior of the action based on whether the request has an attribute subtype including an identifier of the action or a return attribute whose value is to be returned as a result of the request, the return attribute being associated with the action in the definition of the LDAP repository, to access the definition of the LDAP repository for data specifying the action using at least one of the action identifier specified in the request and the return attribute specified in the request, to use data specifying the action in the definition of the LDAP repository to cause the action to be performed with respect to one or more data items in the LDAP repository, the action being represented by associated code, the data specifying the action in the definition of the LDAP repository including the code associated with the action or a reference to the code associated with the action, the action to be performed based on the identified behavior, wherein the definition of the LDAP repository comprises a schema that associates the action with one or more object classes;
    and to return a result of the performed action to a requestor.

15. The apparatus of claim 14 wherein the definition of the LDAP repository comprises a schema that associates the action with one or more object classes.

16. The apparatus of claim 14 wherein:
the action is represented as one or more of a script, an applet, or an independent program.

17. An article of manufacture, comprising:
a machine-accessible storage medium including data that, when accessed by a machine, cause the machine to perform a method comprising:
receiving a request pertaining to data in a Lightweight Directory Access Protocol (LDAP) repository, the request indicating at least one action;
evaluating a format of the request to determine a behavior of the action, wherein evaluating the format comprises identifying a behavior of the action based on whether the request has an attribute subtype including an identifier of the action or a return attribute whose value is to be returned as a result of the request, the return attribute being associated with the action in a definition of the LDAP repository;
accessing the definition of the LDAP repository for data specifying the action using at least one of the action identifier specified in the request and the return attribute specified in the request, the action being represented by associated code, the data specifying the action in the definition of the LDAP repository including the code associated with the action or a reference to the code associated with the action;
using, by the server, the data specifying the action in the definition of the LDAP repository to cause the action to be performed with respect to one or more data items in the LDAP repository, wherein the action is to be performed based on the identified behavior, and wherein the definition of the LDAP repository comprises a schema that associates the action with one or more object classes; and
returning a result of the performed action to a requestor.

18. The article of manufacture of claim 17 wherein the definition of the LDAP repository comprises a schema that associates the action with one or more object classes.

19. The article of manufacture of claim 17 wherein:
the action is represented as one or more of a script, an applet, or an independent program.

20. The article of manufacture of claim 18 wherein the action is stored in the schema as an attribute subtype.

* * * * *